United States Patent
Chen et al.

(10) Patent No.: US 12,489,358 B1
(45) Date of Patent: Dec. 2, 2025

(54) METHOD FOR CONTROLLING CYCLOCONVERTER CIRCUIT, CYCLOCONVERTER CIRCUIT, AND ISOLATED CONVERTER

(71) Applicant: SIGENERGY TECHNOLOGY CO., LTD., Shanghai (CN)

(72) Inventors: Longyu Chen, Shanghai (CN); Wenqiang Gao, Shanghai (CN)

(73) Assignee: SIGENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 19/237,057

(22) Filed: Jun. 13, 2025

(30) Foreign Application Priority Data

Nov. 5, 2024 (CN) .......................... 202411567457.0

(51) Int. Cl.
*H02M 5/293* (2006.01)
*H02M 1/00* (2006.01)
*H02M 5/297* (2006.01)

(52) U.S. Cl.
CPC ......... *H02M 1/0058* (2021.05); *H02M 5/293* (2013.01); *H02M 5/297* (2013.01)

(58) Field of Classification Search
CPC .... H02M 1/0058; H02M 5/293; H02M 5/297; H02M 5/27
See application file for complete search history.

(56) References Cited

U.S. PATENT DOCUMENTS

| 5,594,636 A * | 1/1997 | Schauder ............... H02M 5/297 |
| | | 363/160 |
| 2011/0115285 A1* | 5/2011 | Ransom ............ H02M 3/33584 |
| | | 307/9.1 |

(Continued)

FOREIGN PATENT DOCUMENTS

| CN | 101588132 A | 11/2009 |
| CN | 113765409 A | 12/2021 |

(Continued)

OTHER PUBLICATIONS

First Office Action from corresponding Chinese Application No. 202411567457.0, dated Dec. 31, 2024. English translation attached.

(Continued)

*Primary Examiner* — Gary L Laxton (57) ABSTRACT

Provided are a method for controlling a cycloconverter circuit, a cycloconverter circuit, and an isolated converter. The cycloconverter circuit is configured to perform alternating current to alternating current conversion and includes a plurality of switch elements connected in a plurality of current paths. The plurality of switch elements are divided into a plurality of groups of switch elements. Each group of switch elements includes at least one switch element disposed in each current path. The method includes: when the cycloconverter circuit is in a zero-crossing detection stage, controlling a first group of switch elements to be turned on complementarily and a second group of switch elements to switch between an on state and an off state. During a dead (Continued)

time between drive signals for the first group of switch elements, a first target switch element in the second group of switch elements is turned on.

18 Claims, 6 Drawing Sheets

(56) References Cited

U.S. PATENT DOCUMENTS

| | | | |
|---|---|---|---|
| 2011/0181128 A1* | 7/2011 | Perreault | H02M 7/797 |
| | | | 307/151 |
| 2013/0181634 A1 | 7/2013 | Jmaev | |
| 2019/0207527 A1* | 7/2019 | Norisada | H02M 7/797 |

FOREIGN PATENT DOCUMENTS

| | | |
|---|---|---|
| CN | 114006535 A | 2/2022 |
| CN | 114024437 A | 2/2022 |
| CN | 118041041 A | 5/2024 |
| CN | 118367597 A | 7/2024 |

OTHER PUBLICATIONS

The Grant Notice from corresponding Chinese Application No. 202411567457.0, dated Feb. 24, 2025. English translation attached.

* cited by examiner

When the cycloconverter circuit is in a zero-crossing detection stage, controlling a first group of switch elements to be turned on complementarily and a second group of switch elements to switch between an on state and an off state, wherein during a dead time between drive signals for the first group of switch elements, a first target switch element in the second group of switch elements is turned on, the first target switch element being a switch element located in a same-direction current path as a switch element in the first group of switch elements that is turned on after the dead time ⟋ 10

METHOD FOR CONTROLLING CYCLOCONVERTER CIRCUIT, CYCLOCONVERTER CIRCUIT, AND ISOLATED CONVERTER

CROSS-REFERENCE TO RELATED APPLICATION

This application claims priority and benefits to Chinese Patent Application No. 202411567457.0, filed with China National Intellectual Property Administration on Nov. 5, 2024, the entire disclosure of which is incorporated herein by reference.

FIELD

The present disclosure belongs to the technical field of power control, and more particularly, relates to a method for controlling a cycloconverter circuit, a cycloconverter circuit, and an isolated converter.

BACKGROUND

In new energy photovoltaic, energy storage, and charging scenarios, high-efficiency conversion circuits are required. Among various topological solutions of the conversion circuits, an isolated single-stage topology based on a direct-current side active full-bridge and cycloconverter has attracted increasing attention in the industry due to its advantages of few circuit elements, high conversion efficiency, and input and output electrical isolation.

Switch tubes are classified into high-frequency tubes and low-frequency tubes during a control process of the cycloconverter, and an interchange between the high-frequency tubes and the low-frequency tubes occurs at a zero-crossing point of a voltage of a grid power. In practical applications, a dead time is set during the interchange process in order to avoid a short circuit of a bridge arm caused by shoot-through during the interchange process. During the dead time, all the switch tubes are turned off. However, this can lead to a risk of overstress on the switch tubes.

SUMMARY

The present disclosure aims to solve at least one of the technical problems in the related art. To this end, the present disclosure provides a method for controlling a cycloconverter circuit, a cycloconverter circuit, and an isolated converter, which reduces a risk of voltage overstress on switch tubes and makes it easier to meet a soft-switching condition of zero-voltage switching.

In a first aspect, the present disclosure provides a method for controlling a cycloconverter circuit. The cycloconverter circuit is configured to perform alternating current to alternating current conversion and includes a plurality of switch elements connected in a plurality of current paths. The plurality of switch elements are divided into a plurality of groups of switch elements. Each of the plurality of groups of switch elements includes at least one switch element disposed in each of the plurality of current paths. The method for controlling the cycloconverter circuit includes: when the cycloconverter circuit is in a zero-crossing detection stage, controlling a first group of switch elements to be turned on complementarily and a second group of switch elements to switch between an on state and an off state. During a dead time between drive signals for the first group of switch elements, a first target switch element in the second group of switch elements is turned on. The first target switch element is a switch element located in a same-direction current path as a switch element in the first group of switch elements that is turned on after the dead time.

In the method for controlling the cycloconverter circuit according to the present disclosure, when the cycloconverter circuit is in the zero-crossing detection stage, the first target switch element in the second group of switch elements is turned on within the dead time between the drive signals for the first group of switch elements. Thus, a freewheeling loop is provided for the switch element in the first group of switch elements that is turned on after the dead time, releasing a leakage inductance current and reducing a risk of voltage overstress on a switch tube. As a result, it is easier to meet a soft switching condition of zero-voltage switching.

According to an embodiment of the present disclosure, the first target switch element remains turned on at least until an end of the dead time.

According to an embodiment of the present disclosure, the first target switch element is turned on prior to a start of the dead time.

According to an embodiment of the present disclosure, during the zero-crossing detection stage, the drive signals for the first group of switch elements and drive signals for the second group of switch elements are each pulse signals, and the drive signals for the second group of switch elements lead in phase relative to the drive signals for the first group of switch elements.

According to an embodiment of the present disclosure, a phase lead amount of the drive signals for the second group of switch elements relative to the drive signals for the first group of switch elements is greater than or equal to the dead time between the drive signals for the first group of switch elements.

According to an embodiment of the present disclosure, the drive signals for the second group of switch elements have a same duty cycle and/or a same period as the drive signals for the first group of switch elements.

According to an embodiment of the present disclosure, the method further includes: obtaining a voltage at an output side of the cycloconverter circuit; and determining, from the plurality of groups of switch elements of the cycloconverter circuit, the first group of switch elements and the second group of switch elements based on whether the voltage is positive or negative. A grouping configuration of the plurality of groups of switch elements when the voltage is positive is inverse to that when the voltage is negative.

According to an embodiment of the present disclosure, the method further includes, subsequent to the obtaining the voltage at the output side of the cycloconverter circuit: when an absolute value of the voltage is smaller than or equal to a first voltage threshold, determining that the cycloconverter circuit enters the zero-crossing detection stage.

In a second aspect, the present disclosure provides an isolated converter. The isolated converter includes a transformer, a control unit, and a cycloconverter circuit connected to a first side of the transformer. The control unit is connected to the cycloconverter circuit and is configured to perform the aforementioned method.

In the isolated converter according to the present disclosure, when the cycloconverter circuit is in the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

In a third aspect, the present disclosure provides a cycloconverter circuit. The cycloconverter circuit is configured perform alternating current to alternating current conversion and includes a plurality of switch elements connected in a plurality of current paths. The plurality of switch elements are divided into a plurality of groups of switch elements. Each of the plurality of groups of switch elements includes at least one switch element disposed in each of the plurality of current paths. During a zero-crossing detection stage, a first group of switch elements are turned on complementarily, a second group of switch elements are turned on complementarily, and drive signals for the second group of switch elements lead in phase relative to drive signals for the first group of switch elements.

In the cycloconverter circuit according to the present disclosure, during the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

According to an embodiment of the present disclosure, a phase lead amount of the drive signals for the second group of switch elements relative to the drive signals for the first group of switch elements is greater than or equal to the dead time between the drive signals for the first group of switch elements.

According to an embodiment of the present disclosure, the zero-crossing detection stage includes a positive voltage stage and a negative voltage stage. A grouping configuration of the switch elements during the positive voltage stage is inverse to that during the negative voltage stage, and the grouping configuration of the switch elements refers to a correspondence between the first group of switch elements and the second group of switch elements and switch elements in the cycloconverter circuit.

In a fourth aspect, the present disclosure provides an isolated converter. The isolated converter includes a transformer and the aforementioned cycloconverter circuit. The cycloconverter circuit is electrically connected to a first side of the transformer.

In the isolated converter according to the present disclosure, when the cycloconverter circuit is in the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

Additional aspects and advantages of the embodiments of the present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings.

REFERENCE NUMERALS transformer T, first to twelfth switch tubes S1 to S12, first capacitor C1, second capacitor C2, third capacitor C31, fourth capacitor C32, fifth capacitor C41, and sixth capacitor C42, first to fourth parasitic capacitors $C_{oss1}$ to $C_{oss4}$.

DETAILED DESCRIPTION OF THE EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

In the following description, a "circuit" refers to a conductive loop formed by at least one element or subcircuit through electrical or electromagnetic connections. When an element or circuit is referred to as being "coupled to" or "connected to" another element or an element/circuit is referred to as being "coupled between" or "connected between" two nodes, it may be directly coupled or connected to the other element, or there may be intermediate elements. The connection between the elements may be physical, logical, or a combination thereof. In contrast, when an element is referred to as being "directly coupled to" or "directly connected to" another element, it means that there are no intermediate elements between them.

In the description, the terms "first", "second", etc. are used to distinguish similar objects but not to describe a particular order or sequence. It should be understood that the numerical descriptors used in this way may be interchanged with each other under appropriate circumstances, such that the described embodiments of the present disclosure can be implemented in a sequence other than those illustrated or described in the present disclosure. And objects distinguished by the terms "first", "second", etc., are generally of the same type and do not limit the number of objects. For example, a first object can be one or more. In addition, "and/or" in the specification and claims indicates at least one of the connected objects, and the symbol "/" generally indicates an "or" relationship between the correlated objects preceding and succeeding the symbol.

In addition, descriptions with reference to the terms "an embodiment", "some embodiments", "certain embodiments", "illustrative embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Figure 1:
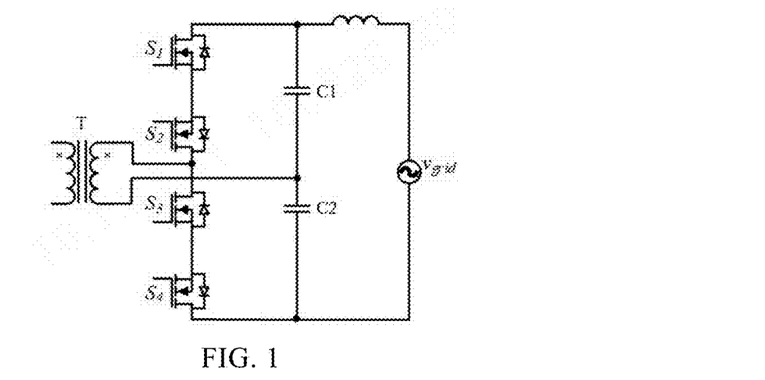
FIG. 1 is a first schematic diagram of a topological structure of a cycloconverter circuit according to an embodiment of the present disclosure.

With reference to FIG. 1, FIG. 1 shows a topological structure of a cycloconverter circuit. The cycloconverter circuit includes a first switch tube S1, a second switch tube S2, a third switch tube S3, and a fourth switch tube S4. The first switch tube S1, the second switch tube S2, the third switch tube S3, and the fourth switch tube S4 are sequentially connected in series and electrically connected between power supply lines. The cycloconverter circuit further includes a first capacitor C1 and a second capacitor C2. The first capacitor C1 and the second capacitor C2 are connected in series and are electrically connected between the power supply lines. A secondary winding of a transformer T has a first terminal electrically connected to a connection node between the second switch tube S2 and the third switch tube S3, and a second terminal electrically connected to a connection node between the first capacitor C1 and the second capacitor C2.

Figure 2:
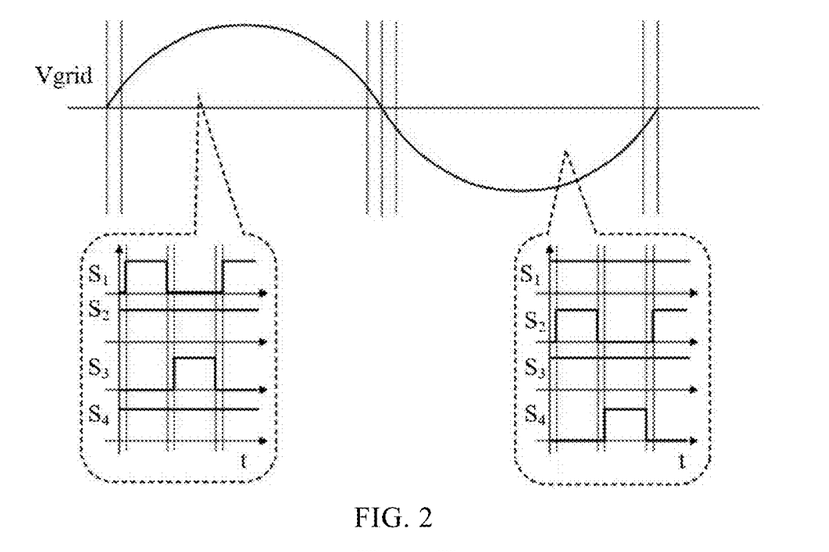
FIG. 2 is a first drive signal waveform diagram of a cycloconverter circuit in the related art.

With reference to FIG. 2, FIG. 2 shows a drive signal waveform diagram of a cycloconverter circuit in the related art. In a traditional drive solution, during a positive half-cycle of a voltage of a grid power, the first switch tube S1 and the third switch tube S3 operate complementarily as high-frequency tubes, and the second switch tube S2 and the fourth switch tube S4 remain normally on as low-frequency tubes. During a negative half-cycle of the voltage of the grid power, the second switch tube S2 and the fourth switch tube S4 operate complementarily as high-frequency tubes, and the first switch tube S1 and the third switch tube S3 remain normally on as low-frequency tubes. In the above two operating modes, near a zero-crossing point of the voltage of the grid power, if a voltage polarity of the grid power is misdetermined due to sampling errors and time delays, shoot-through of a bridge arm may occur. This, in turn, poses a risk of a short circuit in the cycloconverter circuit near the zero-crossing point of the voltage of the grid power, and may result in overstress on the electronic components.

Figure 3:
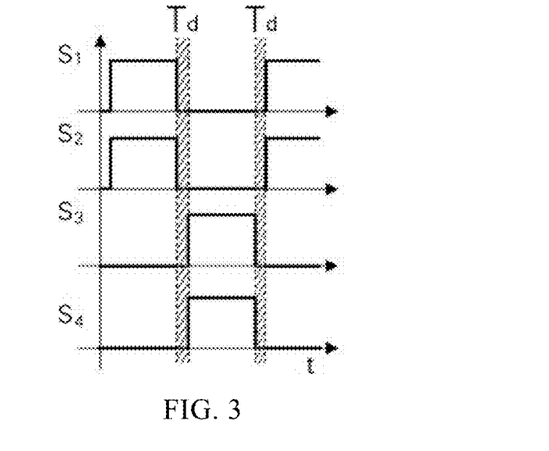
FIG. 3 is a second drive signal waveform diagram of a cycloconverter circuit in the related art.

With reference to FIG. 3, FIG. 3 shows a drive signal waveform diagram of a cycloconverter circuit in the related art. In the related art, in order to solve the risk of the short circuit in the aforementioned cycloconverter circuit, drive signals for the low-frequency tubes are adjusted to have a same frequency as the high-frequency tubes, and are complementary during the positive half-cycle and the negative half-cycle of the voltage of the power grid. Since in the cycloconverter circuit, the switch tubes in a same direction are turned on complementarily and have a dead time between them, there is no short-circuit path in the bridge arm even if the voltage polarity of the grid power is misdetermined. However, during the dead time, all the switch tubes are turned off, and a leakage inductance current on a secondary side loses its freewheeling path, which introduces a risk of voltage overstress on the switch tubes.

Figure 4:
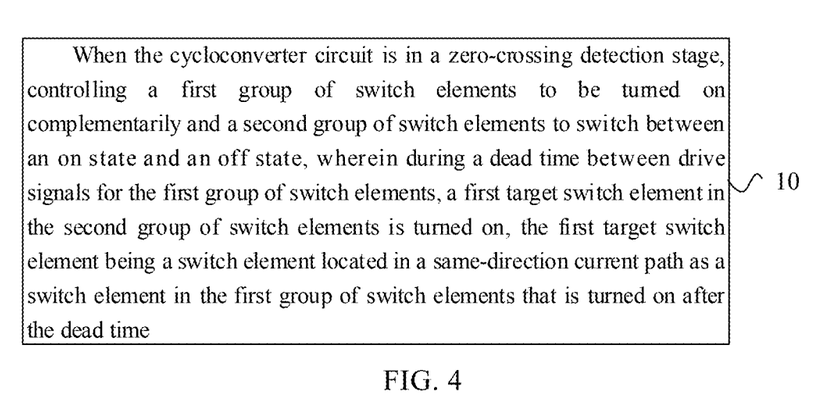
FIG. 4 is a first flowchart of a method for controlling a cycloconverter circuit according to an embodiment of the present disclosure.

With reference to FIG. 4, FIG. 4 shows a flowchart of a method for controlling a cycloconverter circuit according to an embodiment of the present disclosure. An embodiment of the present disclosure provides a method for controlling a cycloconverter circuit. The cycloconverter circuit is configured to perform alternating current to alternating current conversion and includes a plurality of switch elements connected in a plurality of current paths. The plurality of switch elements are divided into a plurality of groups of switch elements. Each of the plurality of groups of switch elements includes at least one switch element disposed in each of the plurality of current paths. The method for controlling the cycloconverter circuit includes step 10.

At step 10, when the cycloconverter circuit is in a zero-crossing detection stage, a first group of switch elements is controlled to be turned on complementarily and a second group of switch elements is controlled to switch between an on state and an off state. During a dead time between drive signals for the first group of switch elements, a first target switch element in the second group of switch elements is turned on. The first target switch element is a switch element located in a same-direction current path as a switch element in the first group of switch elements that is turned on after the dead time.

The switch tubes referred to as the first group of switch elements and the second group of switch elements differ depending on different topologies of the cycloconverter circuit or different polarities of a voltage at an output side of the cycloconverter circuit.

In the topological structure of the cycloconverter circuit shown in FIG. 1, during the zero-crossing detection stage, when the voltage at the output side of the cycloconverter circuit is positive, the first group of switch elements refers to the first switch tube S1 and the third switch tube S3, and the second group of switch elements refers to the second switch tube S2 and the fourth switch tube S4. When the voltage at the output side of the cycloconverter circuit is negative, the first group of switch elements refers to the second switch tube S2 and the fourth switch tube S4, and the second group of switch elements refers to the first switch tube S1 and the third switch tube S3.

Figure 5:
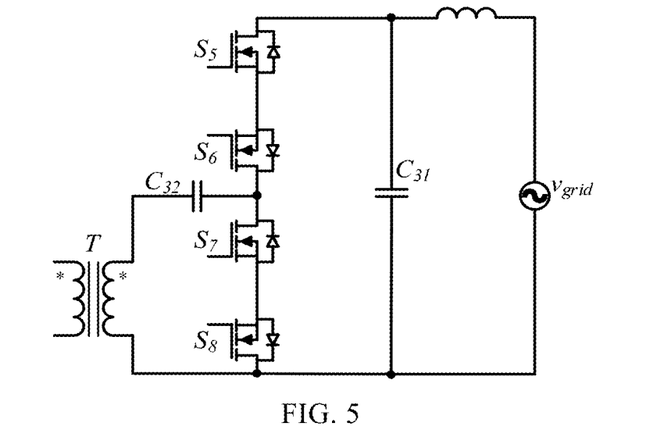
FIG. 5 is a second schematic diagram of a topological structure of a cycloconverter circuit according to an embodiment of the present disclosure.

With reference to FIG. 5, FIG. 5 shows a topological structure of a cycloconverter circuit. The cycloconverter circuit includes a fifth switch tube S5, a sixth switch tube S6, a seventh switch tube S7, and an eighth switch tube S8. The fifth switch tube S5, the sixth switch tube S6, the seventh switch tube S7, and the eighth switch tube S8 are sequentially connected in series and electrically connected between power supply lines. The cycloconverter circuit further includes a third capacitor C31 and a fourth capacitor C32. The third capacitor C31 is electrically connected between the power supply lines, and the fourth capacitor C32 is electrically connected between a first terminal of a secondary winding of the transformer T and a connection node between the sixth switch tube S6 and the seventh switch tube S7. The first terminal of the secondary winding of the transformer T is electrically connected to the connection node between the sixth switch tube S6 and the seventh switch tube S7 via the fourth capacitor C32, and a second terminal of the secondary winding of the transformer T is electrically connected to a connection node between the eighth switch tube S8 and the power supply line.

In the topological structure of the cycloconverter circuit shown in FIG. 5, during the zero-crossing detection stage, when the voltage at the output side of the cycloconverter circuit is positive, the first group of switch elements refers to the fifth switch tube S5 and the seventh switch tube S7, and the second group of switch elements refers to the sixth switch tube S6 and the eighth switch tube S8. When the voltage at the output side of the cycloconverter circuit is negative, the first group of switch elements refers to the sixth switch tube S6 and the eighth switch tube S8, and the second group of switch elements refers to the fifth switch tube S5 and the seventh switch tube S7.

Figure 6:
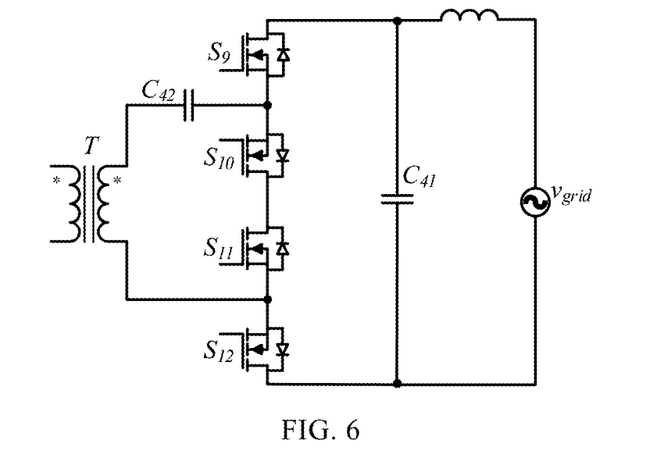
FIG. 6 is a third schematic diagram of a topological structure of a cycloconverter circuit according to an embodiment of the present disclosure.

With reference to FIG. 6, FIG. 6 shows a topological structure of a cycloconverter circuit. The cycloconverter circuit includes a ninth switch tube S9, a tenth switch tube S10, an eleventh switch tube S11, and a twelfth switch tube S12. The ninth switch tube S9, the tenth switch tube S10, the eleventh switch tube S11, and the twelfth switch tube S12 are sequentially connected in series and electrically connected between power supply lines. The cycloconverter circuit further includes a fifth capacitor C41 and a sixth capacitor C42. The fourth capacitor C41 is electrically connected between the power supply lines, and the sixth capacitor C42 is electrically connected between a first terminal of a secondary winding of the transformer T and a connection node between the ninth switch tube S9 and the tenth switch tube S10. The first terminal of the secondary winding of the transformer T is electrically connected to the connection node between the ninth switch tube S9 and the tenth switch tube S10 via the sixth capacitor C42, and a second terminal of the secondary winding of the transformer T is electrically connected to a connection node between the eleventh switch tube S11 and the twelfth switch tube S12.

In the topological structure of the cycloconverter circuit shown in FIG. 6, during the zero-crossing detection stage, when the voltage at the output side of the cycloconverter circuit is positive, the first group of switch elements refers to the ninth switch tube S9 and the eleventh switch tube S11, and the second group of switch elements refers to the tenth switch tube S10 and the twelfth switch tube S12. When the voltage at the output side of the cycloconverter circuit is negative, the first group of switch elements refers to the tenth switch tube S10 and the twelfth switch tube S12, and the second group of switch elements refers to the ninth switch tube S9 and the eleventh switch tube S11.

The cycloconverter circuit further includes a controller electrically connected to the drive terminal of each switch tube and mainly configured to apply a drive signal to a drive terminal of each switch tube to drive each switch tube to operate.

An embodiment of the present disclosure provides a control method, the control method may be executed by the aforementioned controller or a functional module or functional entity in the controller that can perform the control method. The control method according to the embodiment of the present disclosure is described below, taking the controller as an example of the executor.

A method for controlling the cycloconverter circuit according to the present disclosure is described below, taking the topological structure of the cycloconverter circuit shown in FIG. 1 as an example.

The zero-crossing detection stage of the cycloconverter circuit refers to a stage in which the voltage at the output side of the cycloconverter circuit decreases from a positive voltage to a zero voltage and a stage in which the voltage at the output side of the cycloconverter circuit increases from a negative voltage to a zero voltage. When the output side of the cycloconverter circuit is connected to the power grid, the voltage at the output side of the cycloconverter circuit can be a voltage of the power grid.

Figure 7:
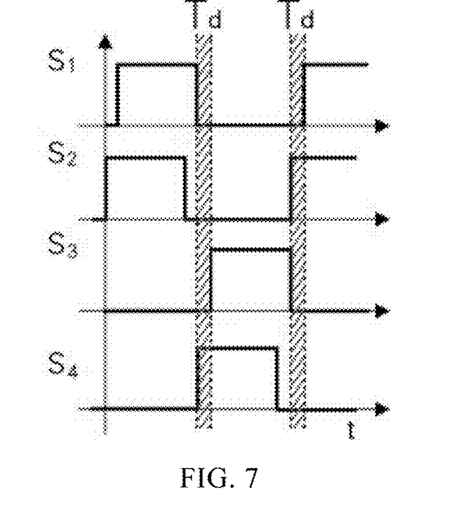
FIG. 7 is a first drive signal waveform diagram of a cycloconverter circuit according to an embodiment of the present disclosure.

With reference to FIG. 7, when the cycloconverter circuit is in the zero-crossing detection stage and the voltage of the power grid is positive, the first switch tube S1 and the third switch tube S3 are turned on complementarily, and the second switch tube S2 and the fourth switch tube S4 are switched between the on state and the off state. During a dead time between drive signals for the first switch tube S1 and the third switch tube S3, the fourth switch tube S4 is turned on. As a result, during the dead time from the moment when the first switch tube S1 is turned off to the moment when the third switch tube S3 is turned on, the fourth switch tube S4 provides a freewheeling path for a leakage inductance current of the third switch tube S3. During the dead time from the moment when the third switch tube S3 is turned off to the moment when the first switch tube S1 is turned on, the second switch tube S2 is turned on, and the second switch tube S2 provides a freewheeling path for a leakage inductance current of the first switch tube S1.

Figure 8:
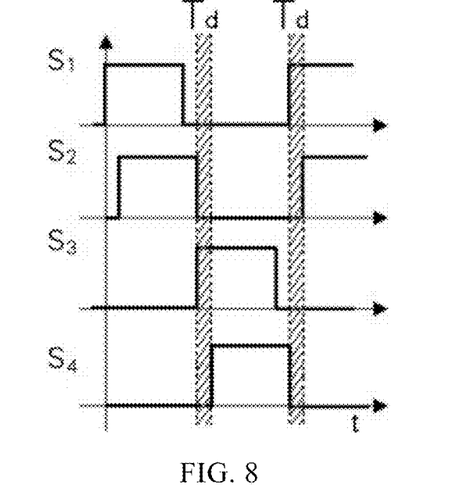
FIG. 8 is a second drive signal waveform diagram of a cycloconverter circuit according to an embodiment of the present disclosure.

With reference to FIG. 8, when the cycloconverter circuit is in the zero-crossing detection stage and the voltage of the grid power is negative, the second switch tube S2 and the fourth switch tube S4 are turned on complementarily, and the first switch tube S1 and the third switch tube S3 are switched between the on state and the off state. During a dead time between drive signals for the second switch tube S2 and the fourth switch tube S4, the third switch tube S3 is turned on. As a result, during the dead time from the moment when the second switch tube S2 is turned off to the moment when the fourth switch tube S4 is turned on, the third switch tube S3 can provides a freewheeling path for a leakage inductance current of the fourth switch tube S4. During the dead time from the moment when the fourth switch tube S4 is turned off to the moment when the second switch tube S2 is turned on, the first switch tube S1 can be turned on, and the first switch tube S1 provides a freewheeling path for a leakage inductance current of the second switch tube S2.

In the method for controlling the cycloconverter circuit according to the present disclosure, when the cycloconverter circuit is in the zero-crossing detection stage, the first target switch element in the second group of switch elements is turned on within the dead time between the drive signals for the first group of switch elements. Thus, the freewheeling path is provided for the switch element in the first group of switch elements that is turned on after the dead time, releasing the leakage inductance current and reducing the risk of voltage overstress on the switch tube. As a result, it is easier to meet a soft switching condition of zero-voltage switching.

In some embodiments, the first target switch element remains turned on at least until an end of the dead time.

With continued reference to FIG. 7, when the cycloconverter circuit is in the zero-crossing detection stage and the voltage of the power grid is positive, within the dead time between the drive signals for the first switch tube S1 and the third switch tube S3, the fourth switch tube S4 remains turned on until the third switch tube S3 is turned on, a freewheeling path for a leakage inductance current within the dead time between the drive signals for the first switch tube S1 and the third switch tube S3 until the third switch tube S3 is turned on. And, the second switch tube S2 remains turned on until the first switch tube S1 is turned on, and thus a freewheeling path can be provided for a leakage inductance current within the dead time between the drive signals for the first switch tube S1 and the third switch tube S3 until the first switch tube S1 is turned on. In this way, the freewheeling path of the leakage inductance current cannot be interrupted, thereby reducing stress caused by the leakage inductance current on the switch tube.

An implementation principle when the cycloconverter circuit is in the zero-crossing detection stage and the voltage of the power grid is negative, an implementation principle is the same as that when the voltage of the power grid is positive, and details thereof are omitted herein.

In some embodiments, the first target switch element is turned on prior to a start of the dead time.

When the cycloconverter circuit is in the zero-crossing detection stage and the voltage of the grid power is positive, prior to the start of the dead time between the drive signals for the first switch tube S1 and the third switch tube S3, the fourth switch tube S4 has been turned on and remains turned on until the end of the dead time, or prior to the start of the dead time between the drive signals for the third switch tube S3 and the first switch tube S1, the second switch tube S2 has been turned on and remains turned on until the end of the dead time. In this way, the freewheeling path can be provided for the leakage inductance current during the entire dead time, further reducing the stress caused by the leakage inductance current on the switch tubes.

An implementation principle when the cycloconverter circuit is in the zero-crossing detection stage and the voltage of the power grid is negative, an implementation principle is the same as that when the voltage of the power grid is positive, and details thereof are omitted herein.

In some embodiments, during the zero-crossing detection stage, the drive signals for the second group of switch elements are a pulse signal, and the drive signals for the second group of switch elements lead in phase relative to the drive signals for the first group of switch elements.

The drive signals for the second group of switch elements lead in phase relative to the drive signals for the first group of switch elements, that is, when the cycloconverter circuit is in the zero-crossing detection stage and the voltage of the power grid is positive, the second switch tube S2 and the fourth switch tube S4 are turned on earlier than the first switch tube S1 and the third switch tube S3.

The fourth switch tube S4 is turned on during the dead time from the moment when the first switch tube S1 is turned off to the moment when the third switch tube S3 is turned on, and the second switch tube S2 is turned on during the dead time from the moment when the third switch tube S3 is turned off to the moment when the first switch tube S1 is turned on. A phase difference between the drive signals for the first switch tube S1 and the third switch tube S3 and the drive signals for the second switch tube S2 and the fourth switch tube S4 can ensure that at least one of the second switch tube S2 and the fourth switch tube S4 is in the on state during the dead time when the first switch tube S1 and the third switch tube S3 are turned on complementarily, to provide the freewheeling path for the leakage inductance current. Moreover, by controlling the drive signals for the second switch tube S2 and the fourth switch tube S4 to lead in phase, the control is simplified and easier to implement.

An implementation principle when the cycloconverter circuit is in the zero-crossing detection stage and the voltage of the grid power is negative is the same as that when the cycloconverter circuit is in the zero-crossing detection stage and the voltage of the grid power is positive, and details thereof are omitted herein.

In some embodiments, a phase lead amount of the drive signals for the second group of switch elements relative to the drive signals for the first group of switch elements is greater than or equal to the dead time between the drive signals for the first group of switch elements.

The phase lead amount of the drive signals for the second group of switch elements relative to the drive signals for the first group of switch elements is equal to the dead time between the drive signals for the first group of switch elements, indicating that the fourth switch tube S4 is turned on at a start of the dead time from the moment when the first switch tube S1 is turned off to the moment when the third switch tube S3 is turned on, and the second switch tube S2 is turned on at a start of the dead time from the moment when the third switch tube S3 is turned off to the moment when the first switch tube S1 is turned on. As a result, the second switch tube S2 and the fourth switch tube S4 provide the freewheeling loop for the leakage inductance current during the dead time between the drive signals for the first switch tube S1 and the third switch tube S3.

The phase lead amount of the drive signals for the second group of switch elements relative to the drive signals for the first group of switch elements is greater than the dead time between the drive signals for the first group of switch elements, indicating that the fourth switch tube S4 has been turned on prior to the start of the dead time from the moment when the first switch tube S1 is turned off to the moment when the third switch tube S3 is turned on, and the second switch tube S2 has been turned on prior to the start of the dead time from the moment when the third switch tube S3 is turned off to the moment when the first switch tube S1 is turned on. In this way, a time margin is provided for the second switch tube S2 and the fourth switch tube S4 to provide the freewheeling path for the leakage inductance current within the dead time between the drive signals for the first switch tube S1 and the third switch tube S3.

In some embodiments, the drive signals for the second group of switch elements have a same duty cycle and/or a same period as the drive signals for the first group of switch elements.

The drive signals for the second group of switch elements can have the same duty cycle as the drive signals for the first group of switch elements, or the drive signals for the second group of switch elements can have the same period as the drive signals for the first group of switch elements, or the drive signals for the second group of switch elements can have the same duty cycle and the same period as the drive signals for the first group of switch elements. In this way, the control is facilitated.

Figure 9:
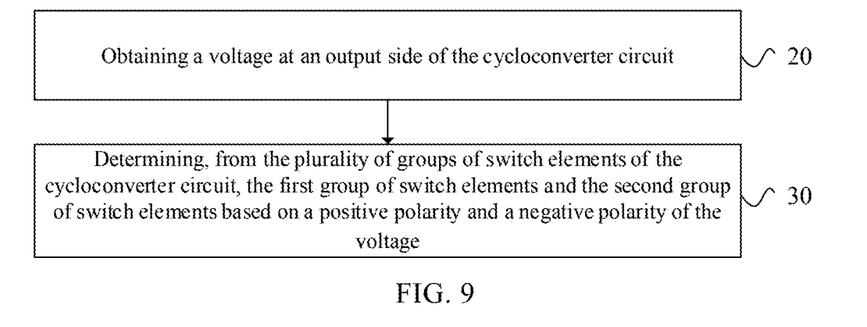
FIG. 9 is a second flowchart of a method for controlling a cycloconverter circuit according to an embodiment of the present disclosure.

With reference to 9, in some embodiments, the method further includes operations at steps 20 and 30.

At step 20, a voltage at an output side of the cycloconverter circuit is obtained.

At step 30, the first group of switch elements and the second group of switch elements is determined from the plurality of groups of switch elements of the cycloconverter circuit, based on whether the voltage is positive or negative. A grouping configuration of the plurality of groups of switch elements when the voltage is positive is inverse to that when the voltage is negative.

In the topological structure of the cycloconverter circuit shown in FIG. 1, when the voltage at the output side of the cycloconverter circuit is positive, the first group of switch elements refers to the first switch tube S1 and the third switch tube S3, and the second group of switch elements refers to the second switch tube S2 and the fourth switch tube S4. When the voltage at the output side of the cycloconverter circuit is negative, the first group of switch elements refers to the second switch tube S2 and the fourth switch tube S4, and the second group of switch elements refers to the first switch tube S1 and the third switch tube S3.

The topological structure of the cycloconverter circuit shown in FIG. 5 has the same grouping configuration of groups of switch elements when the voltage is positive and the same grouping configuration when the voltage is negative as the topological structure of the cycloconverter circuit shown in FIG. 1, and details thereof are omitted herein.

In the topological structure of the cycloconverter circuit shown in FIG. 6, when the voltage at the output side of the cycloconverter circuit is positive, the first group of switch elements refers to the ninth switch tube S9 and the eleventh switch tube S11, and the second group of switch elements refers to the tenth switch tube S10 and the twelfth switch tube S12. When the voltage at the output side of the cycloconverter circuit is negative, the first group of switch elements refers to the tenth switch tube S10 and the twelfth switch tube S12, and the second group of switch elements refers to the ninth switch tube S9 and the eleventh switch tube S11.

In some embodiments, the method further includes, subsequent to the obtaining the voltage at the output side of the cycloconverter circuit: when an absolute value of the voltage is smaller than or equal to a first voltage threshold, determining that the cycloconverter circuit enters the zero-crossing detection stage.

The absolute value of the voltage is smaller than or equal to the first voltage threshold, indicating that a difference between the voltage and a zero voltage is small, which can be regarded as the cycloconverter circuit entering the zero-crossing detection stage.

The first voltage threshold can be selected according to actual application scenarios and is not limited herein. For example, the first voltage threshold may be 2V, 3V, or 4V, etc.

An embodiment of the present disclosure provides an isolated converter. The isolated converter includes a transformer T, a control unit, and a cycloconverter circuit connected to a first side of the transformer T. The control unit is connected to the cycloconverter circuit and is configured to perform the aforementioned method.

The first side of the transformer T may be a side where the secondary winding of the transformer T is located. The cycloconverter circuit can be electrically connected to the secondary winding of the transformer T. The control unit is electrically connected to a drive terminal of each switch tube in the cycloconverter circuit and is mainly configured to apply a drive signal to the drive terminal of each switch tube to drive each switch tube to switch between an on state and an off state.

For specific steps and principles of the method, reference can be made to the aforementioned embodiments, and details thereof are omitted herein.

In the isolated converter according to the present disclosure, when the cycloconverter circuit is in the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

An embodiment of the present disclosure provides a cycloconverter circuit. The cycloconverter circuit is configured to perform alternating current to alternating current conversion and includes a plurality of switch elements connected in a plurality of current paths. The plurality of switch elements are divided into a plurality of groups of switch elements. Each of the plurality of groups of switch elements includes at least one switch element located in each of the plurality of current paths. During a zero-crossing detection stage, a first group of switch elements are turned on complementarily, a second group of switch elements are turned on complementarily, and drive signals for the second group of switch elements lead in phase relative to drive signals for the first group of switch elements.

The topology of the cycloconverter circuit can be selected according to actual application scenarios and is not limited herein.

In the topological structure of the cycloconverter circuit shown in FIG. 1, during the zero-crossing detection stage, when a voltage at an output side of the cycloconverter circuit is positive, the first switch tube S1 and the third switch tube S3 are turned on complementarily, the second switch tube S2 and the fourth switch tube S4 are turned on complementarily, and the drive signals for the second switch tube S2 and the fourth switch tube S4 lead in phase relative to the drive signals for the first group of switch elements. As a result, during a dead time from the moment when the first switch tube S1 is turned off to the moment when the third switch tube S3 is turned on, the fourth switch tube S4 provides a freewheeling path for a leakage inductance current of the third switch tube S3. During a dead time from the moment when the third switch tube S3 is turned off to the moment when the first switch tube S1 is turned on, the second switch tube S2 is turned on, and the second switch tube S2 provides a freewheeling loop for a leakage inductance current of the first switch tube S1.

The method for controlling the topological structure of the cycloconverter circuit shown in FIG. 5 is the same as that shown in FIG. 1, and details thereof are omitted herein.

Figure 10:
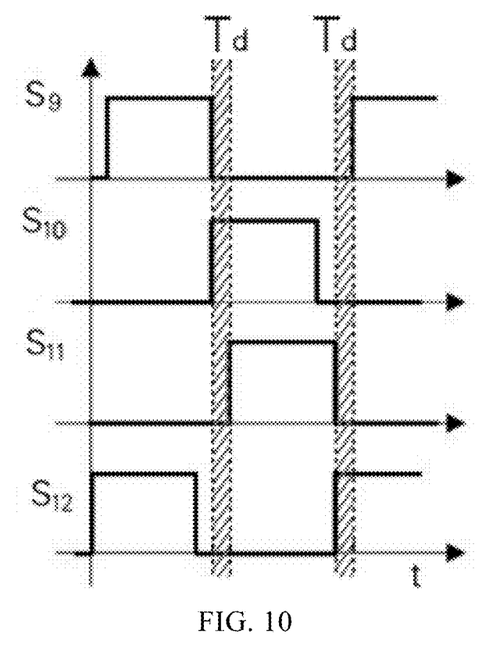
FIG. 10 is a third drive signal waveform diagram of a cycloconverter circuit according to an embodiment of the present disclosure.

With reference to FIG. 10, in the topological structure of the cycloconverter circuit shown in FIG. 6, during the zero-crossing detection stage, when the voltage at the output side of the cycloconverter circuit is positive, the ninth switch tube S9 and the eleventh switch tube S11 are turned on complementarily, the tenth switch tube S10 and the twelfth switch tube S12 are turned on complementarily, and drive signals for the tenth switch tube S10 and the twelfth switch tube S12 lead in phase relative to the drive signals for the first group of switch elements. As a result, during a dead time from the moment when the ninth switch tube S9 is turned off to the moment when the eleventh switch tube S11 is turned on, the tenth switch tube S10 provides a freewheeling path for a leakage inductance current of the eleventh switch tube S11. During a dead time from the moment when the eleventh switch tube S11 is turned off to the moment when the ninth switch tube S9 is turned on, the twelfth switch tube S12 is turned on, and the twelfth switch tube S12 provides a freewheeling loop for a leakage inductance current of the ninth switch tube S9.

Figure 11:
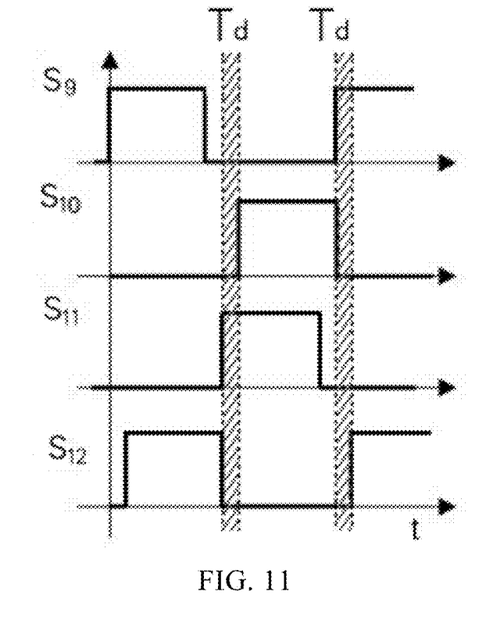
FIG. 11 is a fourth drive signal waveform diagram of a cycloconverter circuit according to an embodiment of the present disclosure.

With reference to FIG. 11, when the cycloconverter circuit is in the zero-crossing detection stage and the voltage of the power grid is negative, an implementation principle is the same as that when the voltage of the power grid is positive, and details thereof are omitted herein.

In the cycloconverter circuit according to the present disclosure, during the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

In some embodiments, a phase lead amount of the drive signals for the second group of switch elements relative to the drive signals for the first group of switch elements is greater than or equal to the dead time between the drive signals for the first group of switch elements.

Figure 12:
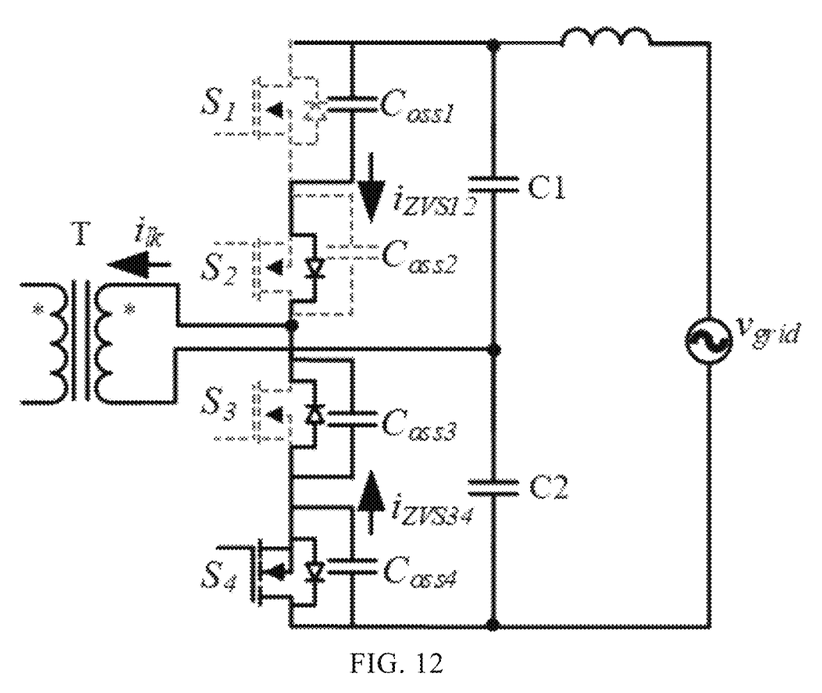
FIG. 12 is a first schematic diagram of a freewheeling path of a cycloconverter circuit according to an embodiment of the present disclosure.

With reference to FIG. 12, in the topological structure of the cycloconverter circuit shown in FIG. 1, when the cycloconverter circuit is in the zero-crossing detection stage and the voltage of the power grid is positive, a secondary leakage inductance current $i_{lk}$ flows from the cycloconverter circuit into the secondary winding of the transformer T when the first switch tube S1 is turned off. Since a phase lead amount of the drive signals for the second switch tube S2 and the fourth switch tube S4 relative to the drive signals for the first switch tube S1 and the third switch tube S3 is equal to the dead time between the drive signals for the first switch tube S1 and the third switch tube S3, two branches are provided for the leakage inductance current $i_{lk}$ for freewheeling. The first branch includes a first parasitic capacitor $C_{oss1}$ of the first switch tube S1 and a body diode of the second switch tube S2, and a second branch includes a third parasitic capacitor $C_{oss3}$ of the third switch tube S3 and the fourth switch tube S4. The corresponding current directions of the branches are shown as $i_{ZVS12}$ and $i_{ZVS34}$ in FIG. 12, respectively. Therefore, during the dead time from the moment when the first switch tube S1 is turned off to the moment when the third switch tube S3 is turned on, $i_{ZVS12}$ charges the first parasitic capacitor $C_{oss1}$ and $i_{ZVS34}$ discharges the third parasitic capacitor $C_{oss3}$. When the third parasitic capacitor $C_{oss3}$ is discharged to zero, a body diode of the third switch tube S3 is turned on. In this case, turning on the third switch tube S3 can realize the zero-voltage switching.

Figure 13:
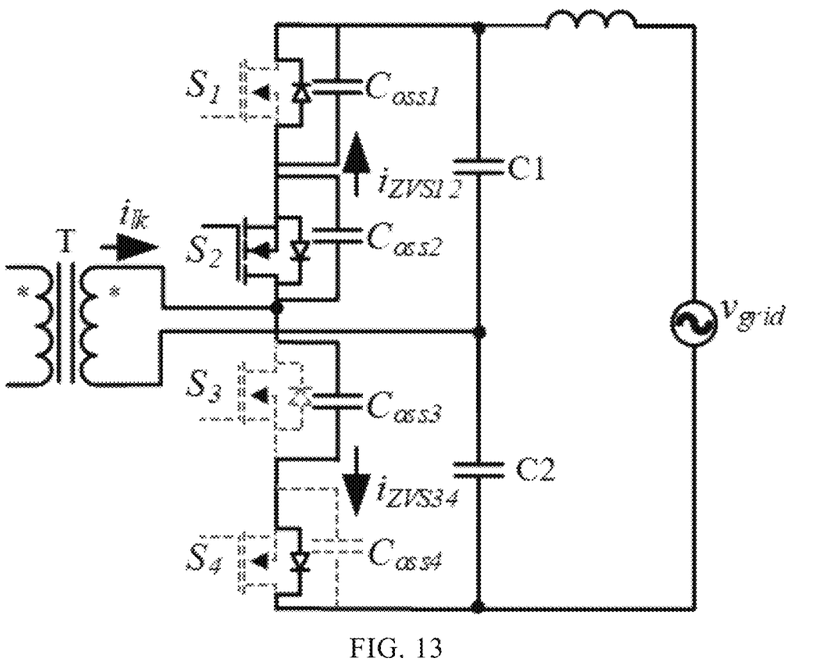
FIG. 13 is a second schematic diagram of a freewheeling path of a cycloconverter circuit according to an embodiment of the present disclosure.

With reference to FIG. 13, when the third switch tube S3 is turned off, the secondary leakage inductance current ink flows from the secondary winding of the transformer T into the cycloconverter circuit. Since the phase lead amount of the drive signals for the second switch tube S2 and the fourth switch tube S4 relative to the drive signals for the first switch tube S1 and the third switch tube S3 is equal to the dead time between the drive signals for the first switch tube S1 and the third switch tube S3, two branches are provided for the leakage inductance current $i_{lk}$ for freewheeling. The first branch includes a first parasitic capacitor $C_{oss1}$ of the first switch tube S1 and the second switch tube S2, and the second branch includes a third parasitic capacitor $C_{oss3}$ of the third switch tube S3 and a body diode of the fourth switch tube S4. Current directions corresponding to the branches are shown as $i_{ZVS12}$ and $i_{ZVS34}$ in FIG. 13, respectively. Therefore, during the dead time from the moment when the third switch tube S3 is turned off to the moment when the first switch tube S1 is turned on, $i_{ZVS12}$ discharges the first parasitic capacitor $C_{oss1}$ and $i_{ZVS34}$ charges the third parasitic capacitor $C_{oss3}$. When the first parasitic capacitor $C_{oss1}$ is discharged to zero, a body diode of the first switch tube S1 is turned on. In this case, turning on the first switch tube S1 can realize the zero voltage switching.

In addition, since the phase lead amount of the drive signals for the second switch tube S2 and the fourth switch tube S4 relative to the drive signals for the first switch tube S1 and the third switch tube S3 is equal to the dead time between the drive signals for the first switch tube S1 and the third switch tube S3, before the first switch tube S1 is turned off, the second switch tube S2 has been turned off in advance for a dead time, with the body diode of the second switch tube S2 conducting the current. Similarly, before the third switch tube S3 is turned off, the fourth switch tube S4 has been turned off in advance for a dead time, with the body diode of the fourth switch tube S4 conducting the current. Since the conducting current is small and the dead time is short at this moment, additional conduction loss of the body diode caused by the phase lead amount of the drive signals for the second group of switch elements relative to the drive signals for the first group of switch elements is very small. In addition, when the voltage of the power grid is positive, the second switch tube S2 and the fourth switch tube S4 does not bear any reverse voltage stress when they are turned off. Therefore, there is no hard switching when the second switch tube S2 and the fourth switch tube S4 are switched, thereby ensuring soft-switch characteristics of all the switch tubes.

Figure 14:
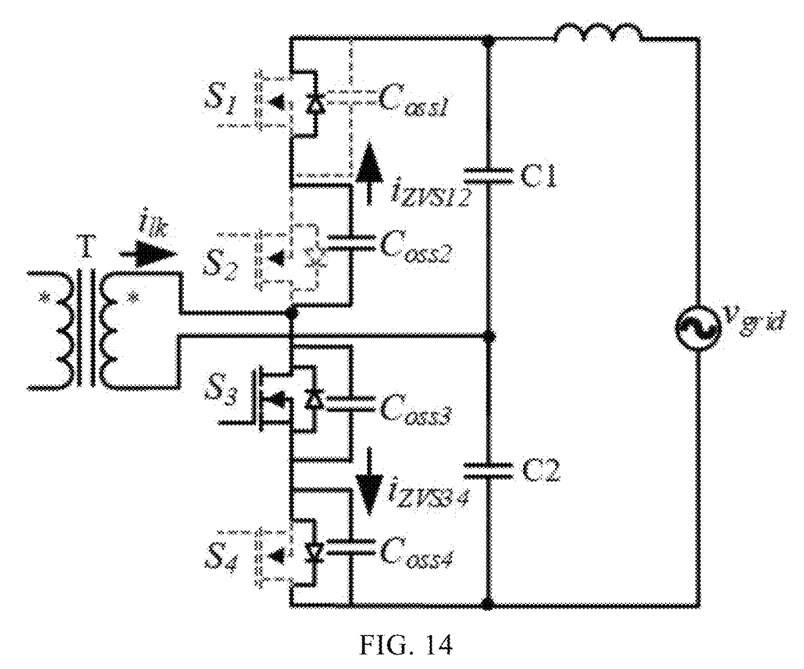
FIG. 14 is a third schematic diagram of a freewheeling path of a cycloconverter circuit according to an embodiment of the present disclosure.

With reference to FIG. 14, in the topological structure of the cycloconverter circuit shown in FIG. 1, when the cycloconverter circuit is in the zero-crossing detection stage and the voltage of the grid power is negative, when the second switch tube S2 is turned off, the secondary leakage inductance current $i_{lk}$ flows from the secondary winding of the transformer T into the cycloconverter circuit. Since the phase lead amount of the drive signals for the first switch tube S1 and the third switch tube S3 relative to the drive signals for the second switch tube S2 and the fourth switch tube S4 is equal to a dead time between the drive signals for the second switch tube S2 and the fourth switch tube S4, two branches are provided for the leakage inductance current $i_{lk}$ for freewheeling. The first branch includes the body diode of the first switch tube S1 and a second parasitic capacitor $C_{oss2}$ of the second switch tube S2, and the second branch includes the third switch tube S3 and a fourth parasitic capacitor $C_{oss4}$ of the fourth switch tube S4. Current directions corresponding to the branches are shown as $i_{ZVS12}$ and $i_{ZVS34}$ in FIG. 14, respectively. Therefore, during the dead time from the moment when the second switch tube S2 is turned off to the moment when the fourth switch tube S4 is turned on, $i_{ZVS12}$ charges the second parasitic capacitor $C_{oss2}$ and $i_{ZVS34}$ discharge the fourth parasitic capacitor $C_{oss4}$. When the fourth parasitic capacitor $C_{oss4}$ is discharged to zero, the body diode of the fourth switch tube S4 is turned on. In this case, turning on the fourth switch tube S4 can realize the zero-voltage switching.

Figure 15:
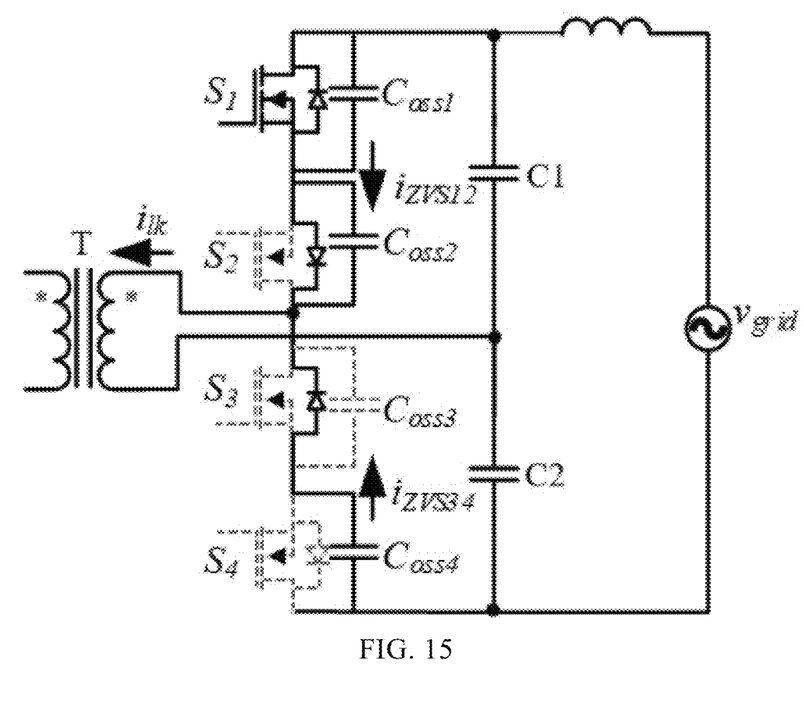
FIG. 15 is a fourth schematic diagram of a freewheeling path of a cycloconverter circuit according to an embodiment of the present disclosure.

With reference to FIG. 15, when the fourth switch tube S4 is turned off, the secondary leakage inductance current $i_{lk}$ flows from the cycloconverter circuit into the secondary winding of the transformer T. Since the phase lead amount of the drive signals for the first switch tube S1 and the third switch tube S3 relative to the drive signals for the second switch tube S2 and the fourth switch tube S4 is equal to the dead time between the drive signals for the second switch tube S2 and the fourth switch tube S4, two branches are provided for the leakage inductance current in for freewheeling. The first branch includes the first switch tube S1 and the second parasitic capacitor $C_{oss2}$ of the second switch tube S2, and the second branch includes the body diode of the third switch tube S3 and the fourth parasitic capacitor $C_{oss4}$ of the fourth switch tube S4. The Current directions corresponding to the branches are shown as $i_{ZVS12}$ and $i_{ZVS34}$ in FIG. 15, respectively. Therefore, during the dead time from the moment when the fourth switch tube S4 is turned off to the moment when the second switch tube S2 is turned on, $i_{ZVS12}$ discharges the second parasitic capacitor $C_{oss2}$ and $i_{ZVS34}$ charges the fourth parasitic capacitor $C_{oss4}$. When the second parasitic capacitor $C_{oss2}$ is discharged to zero, the body diode of the second switch tube S2 is turned on. In this case, turning on the second switch tube S2 can realize the zero-voltage switching.

In addition, since the phase lead amount of the drive signals for the first switch tube S1 and the third switch tube S3 relative to the drive signals for the second switch tube S2 and the fourth switch tube S4 is equal to the dead time between the drive signals for the second switch tube S2 and the fourth switch tube S4, before the second switch tube S2 is turned off, the first switch tube S1 has been turned off in advance for a dead time, with the body diode of the first switch tube S1 conducting the current. Similarly, before the fourth switch tube S4 is turned off, the third switch tube S3 has been turned off in advance for a dead time, with the body diode of the third switch tube S3 conducting the current. Since the conducting current is small and the dead time is short at this moment, additional conduction loss of the body diode caused by the phase lead of the drive signals for the second group of switch elements relative to the drive signals for the first group of switch elements is very small. In addition, when the voltage of the power grid is negative, the first switch tube S1 and the third switch tube S3 does not bear any reverse voltage stress when they are turned off. Therefore, there is no hard switching when the first switch tube S1 and the third switch tube S3 are switched, thereby ensuring the soft-switching characteristics of all the switch tubes.

The phase lead amount of the drive signals for the second group of switch elements relative to the drive signals for the first group of switch elements is greater than the dead time between the drive signals for the first group of switch elements, indicating that the fourth switch tube S4 has been turned on prior to the start of the dead time from the moment when the first switch tube S1 is turned off to the moment when the third switch tube S3 is turned on, and the second switch tube S2 has been turned on prior to the start of the dead time from the moment when the third switch tube S3 is turned off to the moment when the first switch tube S1 is turned on. In this way, a time margin is provided for the second switch tube S2 and the fourth switch tube S4 to provide a freewheeling path for the leakage inductance current within the dead time between the drive signals for the first switch tube S1 and the third switch tube S3.

In the topological structures of the cycloconverter circuits shown in FIGS. 5 and 6, the freewheeling paths within the dead time and the soft-switching implementation principles are the same as those in the topological structure of the cycloconverter circuit shown in FIG. 1, and details thereof are omitted herein.

In some embodiments, the zero-crossing detection stage includes a positive voltage stage and a negative voltage stage. A grouping configuration of the switch elements during the positive voltage stage is inverse to that during the negative voltage stage. The grouping configuration of the switch elements refers to a correspondence between the first group of switch elements and the second group of switch elements and the switch elements in the cycloconverter circuit.

In the topological structure of the cycloconverter circuit shown in FIG. 1, when a voltage at an output side of the cycloconverter circuit is positive, the first group of switch elements refers to the first switch tube S1 and the third switch tube S3, and the second group of switch elements refers to the second switch tube S2 and the fourth switch tube S4. When the voltage at the output side of the cycloconverter circuit is negative, the first group of switch elements refers to the second switch tube S2 and the fourth switch tube S4, and the second group of switch elements refers to the first switch tube S1 and the third switch tube S3.

In the topological structure of the cycloconverter circuit shown in FIG. 5, the grouping configuration of the plurality of groups of switch elements when the voltage is positive and the grouping configuration of the plurality of groups of switch elements when the voltage is negative is the same as those in the topological structure of the cycloconverter circuit shown in FIG. 1, and details thereof are omitted herein.

In the topological structure of the cycloconverter circuit shown in FIG. 6, when a voltage at an output side of the cycloconverter circuit is positive, the first group of switch elements refers to the ninth switch tube S9 and the eleventh switch tube S11, and the second group of switch elements refers to the tenth switch tube S10 and the twelfth switch tube S12. When the voltage at the output side of the cycloconverter circuit is negative, the first group of switch elements refers to the tenth switch tube S10 and the twelfth switch tube S12, and the second group of switch elements refers to the ninth switch tube S9 and the eleventh switch tube S11.

An embodiment of the present disclosure provides an isolated converter. The isolated converter includes a transformer T and the aforementioned cycloconverter circuit. The cycloconverter circuit is electrically connected to a first side of the transformer T.

The first side of the transformer T may be a side where the secondary winding of the transformer T is located, and the cycloconverter circuit may be electrically connected to the secondary winding of the transformer T.

For specific structures and principles of the cycloconverter circuit, reference can be made to the aforementioned embodiments, and details thereof are omitted.

In the isolated converter according to the present disclosure, when the cycloconverter circuit is in the zero-crossing detection stage, the first target switch element in the second group of switch elements is turned on within the dead time between the drive signals for the first group of switch elements. Thus, the freewheeling loop is provided for the switch element in the first group of switch elements that is turned on after the dead time, releasing the leakage inductance current and reducing the risk of the voltage overstress on the switch tube. As a result, it is easier to meet the soft switching condition of the zero-voltage switching.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be defined by the claims as appended and their equivalents.

What is claimed is:

1. A method for controlling a cycloconverter circuit, wherein the cycloconverter circuit is configured to perform alternating current to alternating current conversion and comprises a plurality of switch elements connected in a plurality of current paths, wherein the plurality of switch elements are grouped into a plurality of groups, each of the plurality of groups comprising at least two switch elements disposed in each of the plurality of current paths;
the method comprises:
when the cycloconverter circuit is in a zero-crossing detection stage, controlling the at least two switch elements in a first group among the plurality of groups to be turned on complementarily and the at least two switch elements in a second group among the plurality of groups to be turned on complementarily, wherein:
during a dead time between drive signals for the at least two switch elements in the first group, a first target switch element among the at least two switch elements in the second group is turned on and remains turned on at least until an end of the dead time, the first target switch element being located in a same-direction current path as a switch element that is among the at least two switch elements in the first group and that is turned on after the dead time;
during the zero-crossing detection stage, the drive signals for the at least two switch elements in the first group and drive signals for the at least two switch elements in the second group are each pulse signals, the drive signals for the at least two switch elements in the second group lead in phase relative to the drive signals for the at least two switch elements in the first group, and a phase lead amount of the drive signals for the at least two switch elements in the second group relative to the drive signals for the at least two switch elements in the first group is greater than or equal to the dead time between the drive signals for the at least two switch elements in the first group.

2. The method for controlling the cycloconverter circuit according to claim 1, wherein the drive signals for the at least two switch elements in the second group have a same duty cycle and/or a same period as the drive signals for the at least two switch elements in the first group.

3. The method for controlling the cycloconverter circuit according to claim 1, further comprising:
obtaining a voltage at an output side of the cycloconverter circuit; and
determining, from the plurality of groups into which the plurality of switch elements of the cycloconverter circuit are grouped, the first group and the second group based on whether the voltage is positive or negative,
wherein a grouping configuration of the plurality of groups of switch elements when the voltage is positive is inverse to that when the voltage is negative.

4. The method for controlling the cycloconverter circuit according to claim 3, further comprising, subsequent to said obtaining the voltage at the output side of the cycloconverter circuit:
determining, when an absolute value of the voltage is smaller than or equal to a first voltage threshold, that the cycloconverter circuit enters the zero-crossing detection stage.

5. An isolated converter, comprising:
a transformer;
a control unit; and
a cycloconverter circuit connected to a first side of the transformer, the cycloconverter circuit is configured to perform alternating current to alternating current conversion and comprises a plurality of switch elements connected in a plurality of current paths, wherein the plurality of switch elements are grouped into a plurality of groups, each of the plurality of groups comprising at least two switch elements disposed in each of the plurality of current paths, wherein the control unit is connected to the cycloconverter circuit and is configured to:
when the cycloconverter circuit is in a zero-crossing detection stage, control the at least two switch elements in a first group among the plurality of groups to be turned on complementarily and the at least two switch elements in a second group among the plurality of groups to be turned on complementarily, wherein:
during a dead time between drive signals for the at least two switch elements in the first group, a first target switch element among the at least two switch elements in the second group is turned on and remains turned on at least until an end of the dead time, the first target switch element being located in a same-direction current path as a switch element that is among the at least two switch elements in the first group and that is turned on after the dead time;
during the zero-crossing detection stage, the drive signals for the at least two switch elements in the first group and drive signals for the at least two switch elements in the second group are each pulse signals, the drive signals for the at least two switch elements in the second group lead in phase relative to the drive signals for the at least two switch elements in the first group, and a phase lead amount of the drive signals for the at least two switch elements in the second group relative to the drive signals for the at least two switch elements in the first group is greater than or equal to the dead time between the drive signals for the at least two switch elements in the first group.

6. The isolated converter according to claim 5, wherein the drive signals for the at least two switch elements in the second group have a same duty cycle and/or a same period as the drive signals for the at least two switch elements in the first group.

7. The isolated converter according to claim 5, wherein the control unit is further configured to:
obtain a voltage at an output side of the cycloconverter circuit; and
determine, from the plurality of groups into which the plurality of switch elements of the cycloconverter circuit are grouped, the first group and the second group based on whether the voltage is positive or negative,
wherein a grouping configuration of the plurality of switch elements when the voltage is positive is inverse to that when the voltage is negative.

8. The isolated converter according to claim 7, wherein the control unit is further configured to, subsequent to obtaining the voltage at the output side of the cycloconverter circuit:

determine, when an absolute value of the voltage is smaller than or equal to a first voltage threshold, that the cycloconverter circuit enters the zero-crossing detection stage.

9. A cycloconverter circuit, comprising a first group of switch elements and a second group of switch elements, wherein during a zero-crossing detection stage, the first group of switch elements are turned on complementarily, the second group of switch elements are turned on complementarily, and drive signals for the second group of switch elements lead in phase relative to drive signals for the first group of switch elements, wherein a phase lead amount of the drive signals for the second group of switch elements relative to the drive signals for the first group of switch elements is greater than or equal to the dead time between the drive signals for the first group of switch elements.

10. The cycloconverter circuit according to claim 9, wherein the zero-crossing detection stage comprises a positive voltage stage and a negative voltage stage, a grouping configuration of the switch elements during the positive voltage stage being inverse to that during the negative voltage stage, wherein the grouping configuration of the switch elements refers to a correspondence between the first group of switch elements and the second group of switch elements and switch elements in the cycloconverter circuit.

11. The cycloconverter circuit according to claim 9, comprising a first switch tube, a second switch tube, a third switch tube, a fourth switch tube, a first capacitor, and a second capacitor, wherein the first switch tube, the second switch tube, the third switch tube, and the fourth switch tube are sequentially connected in series and electrically connected between power supply lines, the first capacitor and the second capacitor are connected in series and electrically connected between the power supply lines, a connection node between the second switch tube and the third switch tube is electrically connected to a first terminal of a secondary winding of a transformer electrically connected to the cycloconverter circuit, and a connection node between the first capacitor and the second capacitor is electrically connected to a second terminal of the secondary winding of the transformer, wherein during the zero-crossing detection stage:
when a voltage at an output side of the cycloconverter circuit is positive, the first group of switch elements comprises the first switch tube and the third switch tube, and the second group of switch elements comprises the second switch tube and the fourth switch tube;
when the voltage at the output side of the cycloconverter circuit is negative, the first group of switch elements comprises the second switch tube and the fourth switch tube, and the second group of switch elements comprises the first switch tube and the third switch tube.

12. The cycloconverter circuit according to claim 9, comprising a fifth switch tube, a sixth switch tube, a seventh switch tube, an eighth switch tube, a third capacitor, and a fourth capacitor, wherein the fifth switch tube, the sixth switch tube, the seventh switch tube, and the eighth switch tube are sequentially connected in series and electrically connected between power supply lines, the third capacitor is electrically connected between the power supply lines, a connection node between the sixth switch tube and the seventh switch tube is electrically connected, via the fourth capacitor, to a first terminal of a secondary winding of the transformer electrically connected to the cycloconverter circuit, and a connection node between the eighth switch tube and the power supply line is electrically connected to a second terminal of the secondary winding of the transformer, wherein during the zero-crossing detection stage:
when a voltage at an output side of the cycloconverter circuit is positive, the first group of switch elements comprises the fifth switch tube and the seventh switch tube, and the second group of switch elements comprises the sixth switch tube and the eighth switch tube;
when the voltage at the output side of the cycloconverter circuit is negative, the first group of switch elements comprises the sixth switch tube and the eighth switch tube, and the second group of switch elements comprises the fifth switch tube and the seventh switch tube.

13. The cycloconverter circuit according to claim 9, comprising a ninth switch tube, a tenth switch tube, an eleventh switch tube, a twelfth switch tube, a fifth capacitor, and a sixth capacitor, wherein the ninth switch tube, the tenth switch tube, the eleventh switch tube, and the twelfth switch tube are sequentially connected in series and electrically connected between power supply lines, the fifth capacitor is electrically connected between the power supply lines, a connection node between the ninth switch tube and the tenth switch tube is electrically connected, via the sixth capacitor, to a first terminal of a secondary winding of the transformer electrically connected to the cycloconverter circuit, and a connection node between the eleventh switch tube and the twelfth switch tube is electrically connected to a second terminal of the secondary winding of the transformer, wherein during the zero-crossing detection stage:
when a voltage at an output side of the cycloconverter circuit is positive, the first group of switch elements comprises the ninth switch tube and the eleventh switch tube, and the second group of switch elements comprises the tenth switch tube and the twelfth switch tube;
when the voltage at the output side of the cycloconverter circuit is negative, the first group of switch elements comprises the tenth switch tube and the twelfth switch tube, and the second group of switch elements comprises the ninth switch tube and the eleventh switch tube.

14. An isolated converter, comprising a transformer and the cycloconverter circuit according to claim 9, the cycloconverter circuit being electrically connected to a first side of the transformer.

15. The isolated converter according to claim 14, wherein the zero-crossing detection stage comprises a positive voltage stage and a negative voltage stage, a grouping configuration of the switch elements during the positive voltage stage being inverse to that during the negative voltage stage, wherein the grouping configuration of the switch elements refers to a correspondence between the first group of switch elements and the second group of switch elements and switch elements in the cycloconverter circuit.

16. The isolated converter according to claim 14, wherein the cycloconverter circuit comprises a first switch tube, a second switch tube, a third switch tube, a fourth switch tube, a first capacitor, and a second capacitor, wherein the first switch tube, the second switch tube, the third switch tube, and the fourth switch tube are sequentially connected in series and electrically connected between power supply lines, the first capacitor and the second capacitor are connected in series and electrically connected between the power supply lines, a connection node between the second switch tube and the third switch tube is electrically connected to a first terminal of a secondary winding of the transformer electrically connected to the cycloconverter circuit, and a connection node between the first capacitor and the second capacitor is electrically connected to a second terminal of the secondary winding of the transformer, wherein during the zero-crossing detection stage:
  when a voltage at an output side of the cycloconverter circuit is positive, the first group of switch elements comprises the first switch tube and the third switch tube, and the second group of switch elements comprises the second switch tube and the fourth switch tube;
  when the voltage at the output side of the cycloconverter circuit is negative, the first group of switch elements includes the second switch tube and the fourth switch tube, and the second group of switch elements includes the first switch tube and the third switch tube.

17. The isolated converter according to claim 14, wherein the cycloconverter circuit comprises a fifth switch tube, a sixth switch tube, a seventh switch tube, an eighth switch tube, a third capacitor, and a fourth capacitor, wherein the fifth switch tube, the sixth switch tube, the seventh switch tube, and the eighth switch tube are sequentially connected in series and electrically connected between power supply lines, the third capacitor is electrically connected between the power supply lines, a connection node between the sixth switch tube and the seventh switch tube is electrically connected, via the fourth capacitor, to a first terminal of a secondary winding of the transformer electrically connected to the cycloconverter circuit, and a connection node between the eighth switch tube and the power supply line is electrically connected to a second terminal of the secondary winding of the transformer, wherein during the zero-crossing detection stage:
  when a voltage at an output side of the cycloconverter circuit is positive, the first group of switch elements comprises the fifth switch tube and the seventh switch tube, and the second group of switch elements comprises the sixth switch tube and the eighth switch tube;
  when the voltage at the output side of the cycloconverter circuit is negative, the first group of switch elements comprises the sixth switch tube and the eighth switch tube, and the second group of switch elements comprises the fifth switch tube and the seventh switch tube.

18. The isolated converter according to claim 14, wherein the cycloconverter circuit comprises a ninth switch tube, a tenth switch tube, an eleventh switch tube, a twelfth switch tube, a fifth capacitor, and a sixth capacitor, wherein the ninth switch tube, the tenth switch tube, the eleventh switch tube, and the twelfth switch tube are sequentially connected in series and electrically connected between power supply lines, the fifth capacitor is electrically connected between the power supply lines, a connection node between the ninth switch tube and the tenth switch tube is electrically connected, via the sixth capacitor, to a first terminal of a secondary winding of the transformer electrically connected to the cycloconverter circuit, and a connection node between the eleventh switch tube and the twelfth switch tube is electrically connected to a second terminal of the secondary winding of the transformer, wherein during the zero-crossing detection stage:
  when a voltage at an output side of the cycloconverter circuit is positive, the first group of switch elements comprises the ninth switch tube and the eleventh switch tube, and the second group of switch elements comprises the tenth switch tube and the twelfth switch tube;
  when the voltage at the output side of the cycloconverter circuit is negative, the first group of switch elements comprises the tenth switch tube and the twelfth switch tube, and the second group of switch elements comprises the ninth switch tube and the eleventh switch tube.

* * * * *